E. I. DODDS.
PORTABLE LAMP.
APPLICATION FILED JULY 25, 1917.
1,275,872.
Patented Aug. 13, 1918.
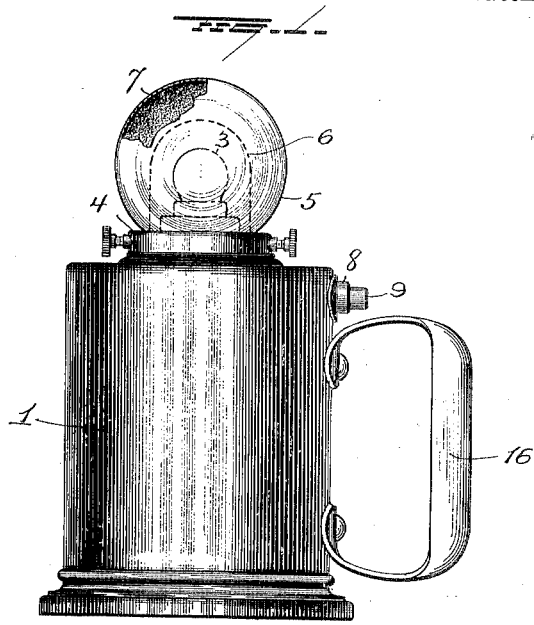
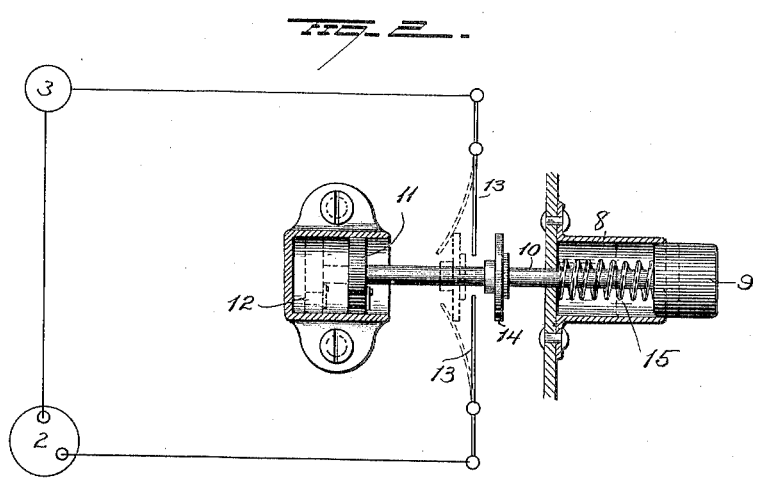
WITNESSES
E. Nottingham
G. F. Downing
INVENTOR
E. I. Dodds
By Seymour & Bright
Attorneys

UNITED STATES PATENT OFFICE.

ETHAN I. DODDS, OF PITTSBURGH, PENNSYLVANIA, ASSIGNOR TO FLANNERY BOLT COMPANY, OF PITTSBURGH, PENNSYLVANIA.

PORTABLE LAMP.

1,275,872.  Specification of Letters Patent.  Patented Aug. 13, 1918.

Application filed July 25, 1917. Serial No. 182,746.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Portable Lamps; and I do hereby declare the following to be a full, clear, and exact description of the invention, such as will enable others skilled in the art to which it appertains to make and use the same.

This invention relates to improvements in portable lighting devices,—the object of the invention being to provide a lamp containing material which may be made luminous by a primary source of light contained within the lamp, and which will retain its luminosity for a considerable period after the primary source of light shall have been extinguished, whereby the lamp may be employed in places where a mild light is desired.

A further object is to provide a portable electric lamp with illuminating means activated by light flashes from the lamp filament, and which may be kept luminous for a considerable period after the electric light shall have been extinguished, and thus economize in the use of electric current from the small battery carried by such portable electric lamps.

A further object is to provide simple and efficient means for controlling the lighting and extinguishing of the primary electric lamp.

With these and other objects in view, the invention consists in certain novel features of construction and combinations of parts as hereinafter set forth and pointed out in the claims.

In the accompanying drawings; Figure 1 is a view of a lamp structure embodying my invention and Fig. 2 is an enlarged detail view.

1 represents a casing which may contain a battery (illustrated diagrammatically at 2, Fig. 2) suitable for lighting a small incandescent lamp 3. The lamp 3 is supported by a suitable bracket or holder 4 mounted upon the casing 1, and this bracket or holder also supports globes 5 and 6, one disposed within the other and the inner globe 6 containing the incandescent lamp 3.

The inner face of the outer globe 5 is coated as at 7 with a material which will absorb light,—viz., be activated to be rendered luminous,—by light rays emanating from the incandescent lamp 3,—or if desired the coating may be applied to the exterior of the inner globe. Such coating may comprise such material as zinc or calcium sulfid and also preferably contain a very small quantity of radioactive material, such as a salt of radium.

Experience has shown that such an illuminating coating may be activated periodically by comparatively short light flashes and that the coated globe will remain luminous for a considerable length of time after the incandescent lamp shall have been extinguished, and that it will afford sufficient light to illuminate the surrounding area for ordinary purposes where a mild light is desired.

To facilitate the closing of the circuit of the incandescent lamp and keeping it closed for a brief period sufficient to insure the proper activating or energizing of the light absorbing coating, the devices now to be explained, may be employed.

The casing 1 is provided with a thimble 8 which receives a push button 9. A rod 10 is connected with the push button and passes through a suitable hole in the casing,—the inner end of said rod being provided with a valved piston 11 which operates in an air pot 12 secured within the casing 1. Flexible contact fingers 13—13 are suitably supported within the casing 1 at respective sides of the rod 10, and the latter carries a connector 14 which may conveniently consist of a disk secured to the rod. The fingers of the circuit closer thus formed may be included in series with battery 2 and lamp 3 as illustrated in Fig. 2. A spring 15 located within the thimble 8 serves to retain the push button and connector in and return them to normal position, with the connector 14 out of contact with the fingers 13 and the lamp circuit open.

It is apparent that by operating the push button 9, the connector 14 will engage the spring fingers 13, thus closing the lamp circuit and pressing said fingers inwardly as illustrated by dotted lines in Fig. 2. During the inward movement of the push button, the piston 11 will move freely in the air pot 12, but when the operator releases the push button, the return movement of the same and the connector 14 will be retarded by the air-pot structure and the lamp circuit will thus be closed and the incandescent lamp kept lighted for a sufficient length of time to insure the proper activating or energizing the illuminating coating, even though the operator should release the push button immediately after having pressed the same inwardly.

The casing 1 may be provided with a handle 16.

Having fully described my invention, what I claim as new and desire to secure by Letters-Patent, is:—

1. A portable lamp comprising a casing, electric lighting means carried thereby, a globe mounted on said casing and containing phosphorescent material and inclosing the source of light of said lighting means, means for closing and opening the circuit of said electric lighting means, and means for retarding the opening of said circuit.

2. A portable lamp, comprising a casing, a globe mounted on said casing, a coating of phosphorescent material within said globe, an electric lamp disposed within said globe, means within the casing for supplying electric current to such electric lamp, a manually operable circuit closer carried by the casing for controlling the electric lamp to activate the said phosphorescent coating, means for opening said circuit closer, and means for retarding the opening of the circuit closer.

3. A lamp comprising a globe containing a coating of phosphorescent material, an electric lighting device within the globe for activating said coating, an electric circuit for said lighting device, a circuit closer comprising yielding fingers included in said electric circuit and a movable spring-actuated connector for said fingers, and an airpot structure for retarding the movement of said connector when the same moves toward position to open the circuit of the lighting device.

In testimony whereof I have signed this specification in the presence of two subscribing witnesses.

ETHAN I. DODDS.

Witnesses:
EDWIN SPENCERBY,
F. H. ALLISON.